May 15, 1934.  W. B. MORTON ET AL  1,958,520
DISPLAY EQUIPMENT
Filed April 6, 1933  4 Sheets-Sheet 1

Inventors
William B. Morton.
Lawrence F. Beisner.

By Cushman, Darby & Cushman
Attorneys

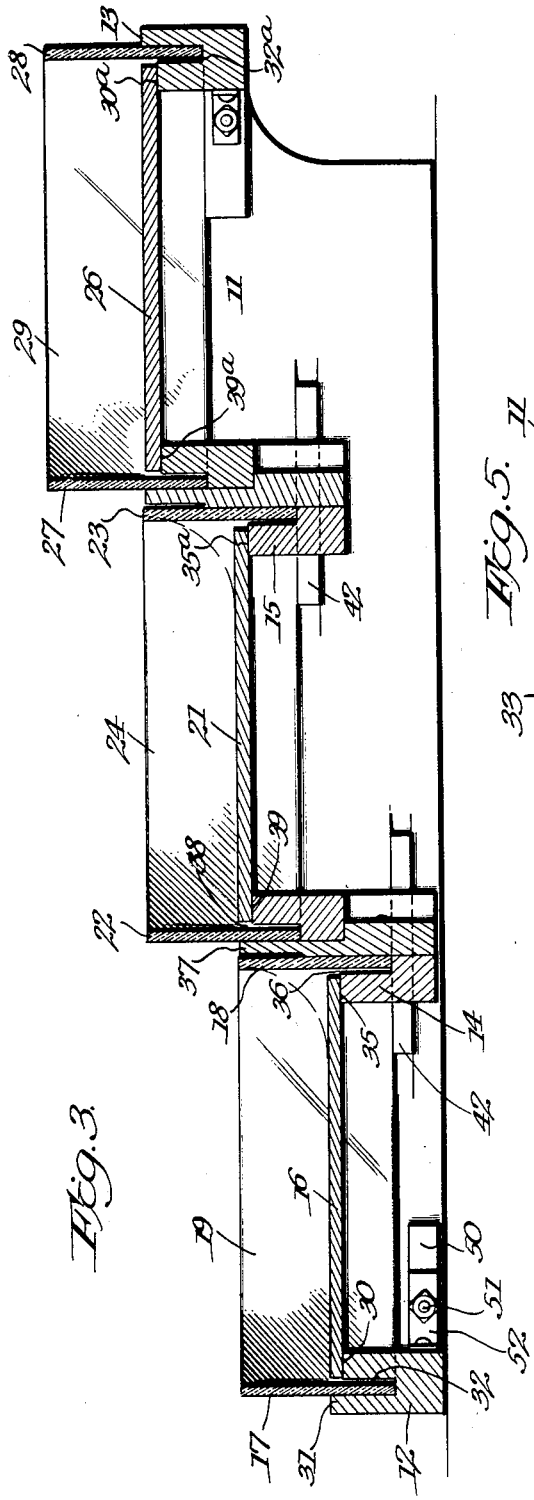

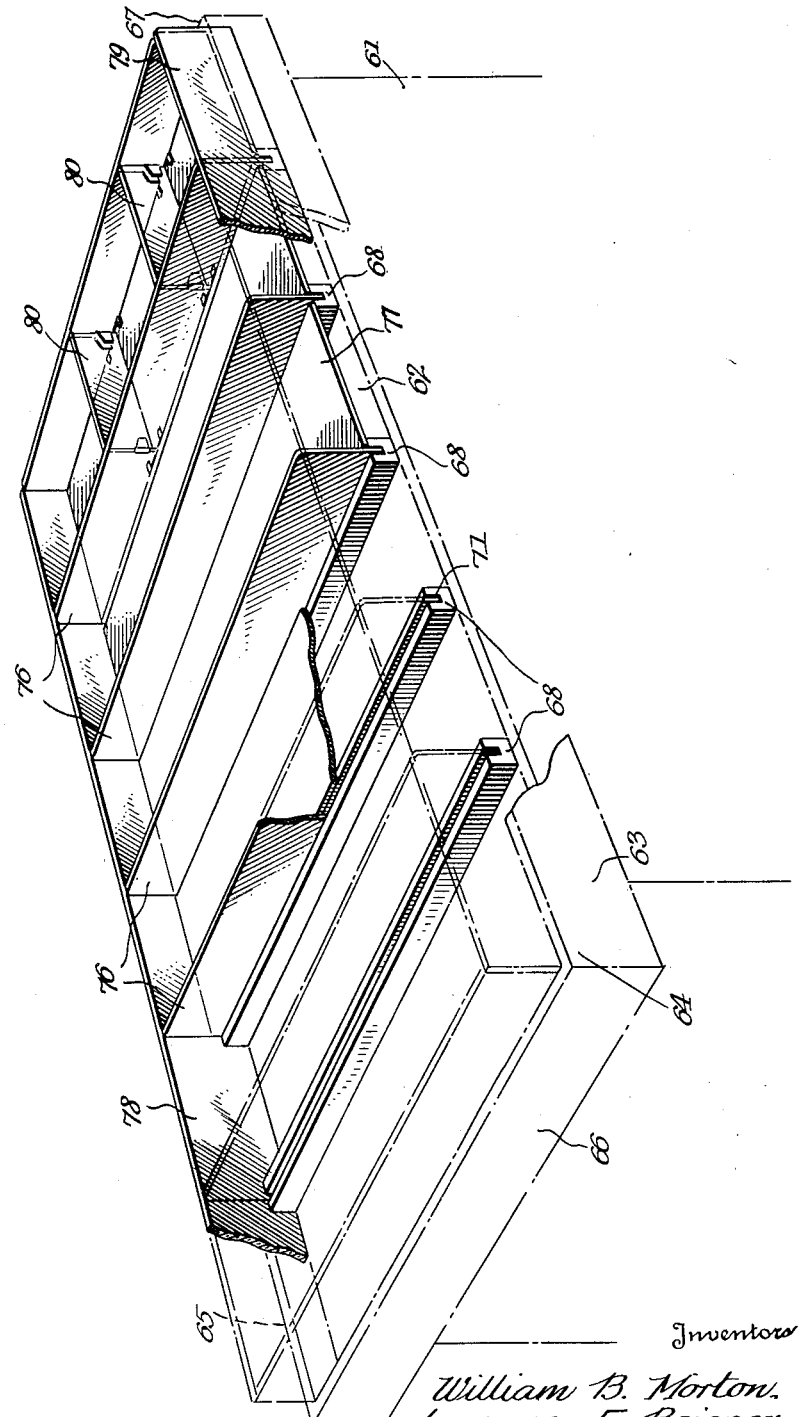

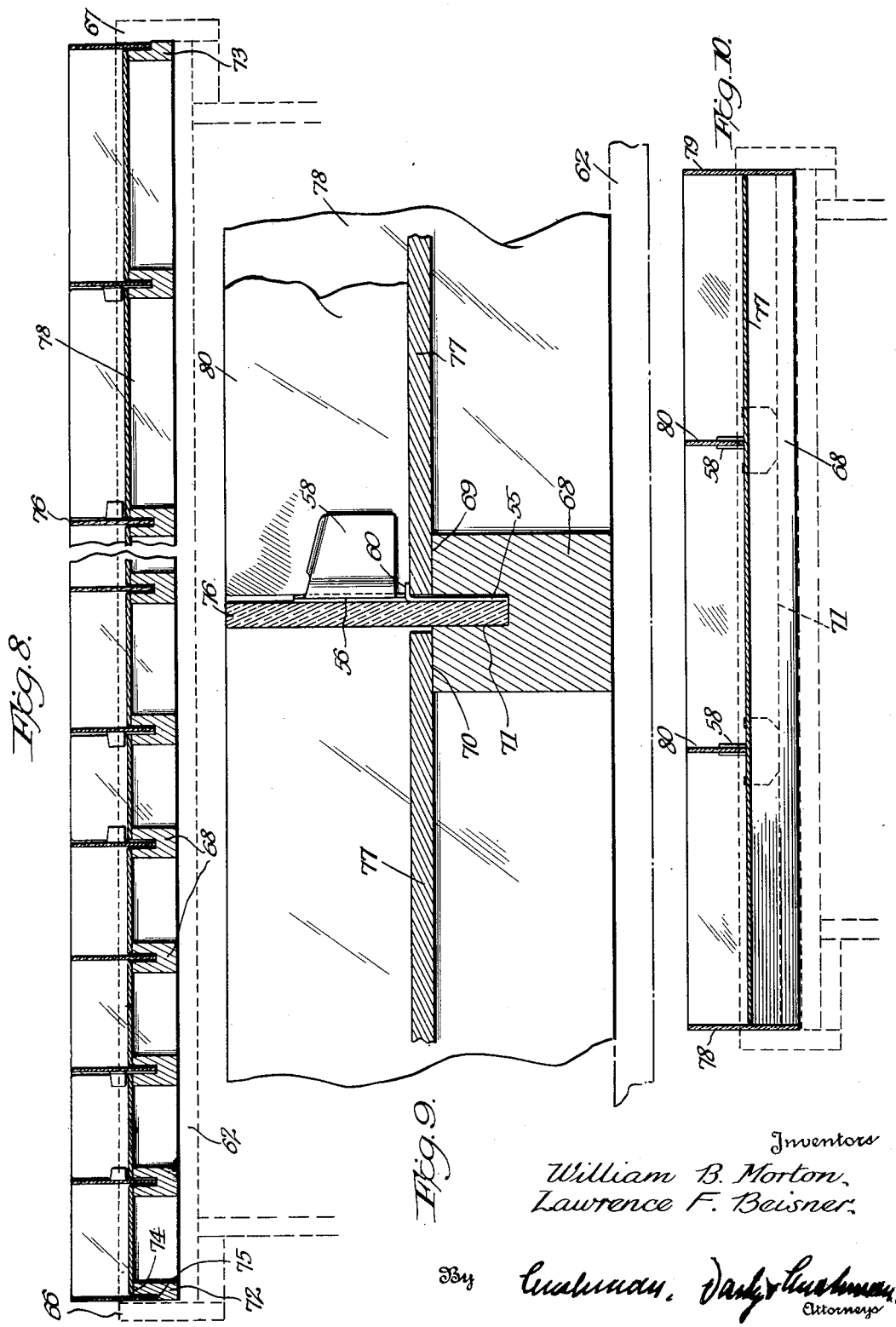

Patented May 15, 1934

1,958,520

UNITED STATES PATENT OFFICE 1,958,520

DISPLAY EQUIPMENT

William B. Morton and Lawrence F. Beisner, Beatrice, Nebr.

Application April 6, 1933, Serial No. 664,810

27 Claims. (Cl. 211—128)

This invention relates to display equipment, and more particularly, to a new and improved type of equipment in the form of a plurality of merchandise displaying trays, which may be assembled in a number of different ways to accommodate various sizes and kinds of objects.

The invention also relates to a means for partitioning the various display trays.

It is a primary object of the present invention to provide display equipment adapted to be associated with a counter or table in a store, and to make such equipment simple in construction and attractive in appearance.

It is a further object of the invention to provide knock-down or separable display equipment adapted to be assembled on a counter or table in a store, in the form of a plurality of trays, which may be horizontally aligned, one with respect to another, or disposed in terraced relation.

It is a further object of the invention to provide display equipment adapted to be associated with the flanged top of a store table or counter to provide a plurality of raised display trays within the flange of the counter or table, and to utilize that flange in securing certain parts of the equipment in predetermined position.

A further object of the invention is to provide a device of this general character in which as many as possible of the individual parts thereof are of the same size and form, and, consequently, are interchangeable. Such a construction is advantageous because it simplifies the assembly of the device by the storekeeper and also because it results in a material saving in the original manufacturing cost through standardization.

It is a further object of the present invention to provide a display stand comprising a plurality of similar horizontally spaced trays supported in an appropriate base, in such manner that the several trays are readily removable for cleaning or the like. Furthermore, the individual trays are preferably made up of a plurality of panels and plates, each of which is individually removable for cleaning or replacement, without disturbing the predetermined position of the others.

In one form of the invention the horizontally disposed trays are horizontally aligned, one with respect to the other, while in another form the trays are vertically stepped, or disposed in terraced relation.

It is a further object of the invention to provide a new and improved partitioning means for the trays. Preferably, the partitions comprise vertically disposed plates supported upon the tray bottom panels, and adjustably held in place by means of special positioning clips which cooperate with other parts of the display equipment in a novel manner.

Although in the specific embodiments of the invention illustrated in the accompanying drawings and described below, certain parts of the equipment are made of wood, and other parts of glass, it will be understood that the invention is not limited to specific materials because appropriate substitutes may be used if desired.

In the accompanying drawings,

Figure 3 is a central longitudinal sectional view of the equipment of Figure 1.

Figure 4 is a perspective view of one end of one of the intermediate, transverse, supporting members or bars.

Figure 5 is a plan view of a preferred corner construction.

Figure 6 is a detailed view of a specific form of partition positioning clip.

Figure 7 is a perspective view of a second form of display equipment assembled upon a conventional, flanged counter or table.

Figure 8 is a vertical longitudinal sectional view of the equipment shown in Figure 7.

Figure 9 is a greatly enlarged sectional view showing in detail, certain important features of the invention; and Figure 10 is a vertical transverse sectional view of the equipment shown in Figures 7 and 8.

Figure 1:
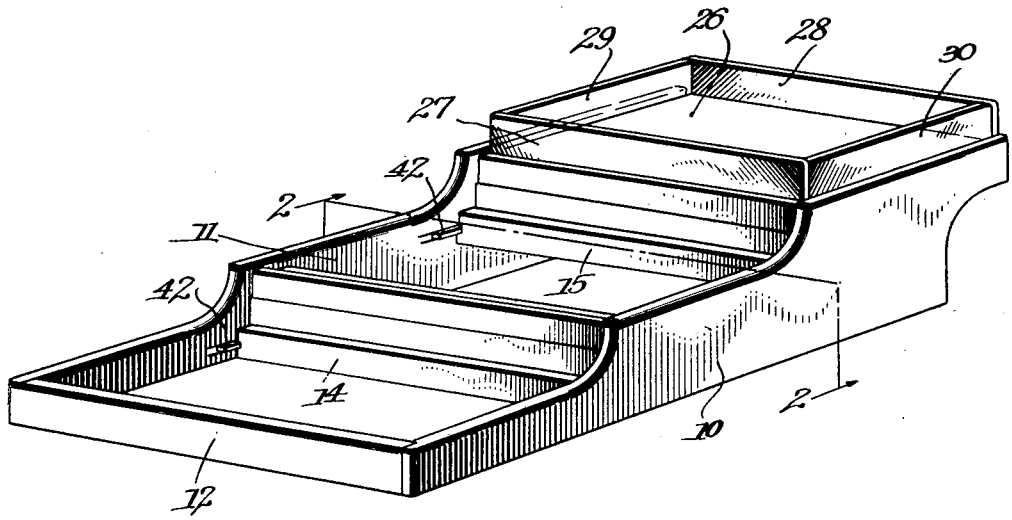
Figure 1 is a perspective view of one form of display equipment with certain parts removed for the sake of clearness.

In the first embodiment of the invention illustrated, an appropriate rectangular base is provided, made up of longitudinal side frame members 10, 11, and transverse front and rear end frame members 12, 13, respectively. These members are interconnected at their ends by an appropriate separable connecting means, such as that disclosed in Figure 6 and particularly described below.

Extending between the side members are a plurality of transverse supporting members, or bars, 14, 15. These bars cooperate with the front and rear end members, and with each other, and act as means for supporting a plurality of horizontally disposed terraced trays. Although, in the embodiment of the invention disclosed herein, three such trays are shown, it should be understood that the invention contemplates providing any appropriate number of trays.

Each of these trays is made up of a bottom panel, and upwardly extending, substantially vertically disposed edge plates. In Figure 3, three trays are shown in section, the first or lowermost tray comprising bottom panel 16, front and rear edge plates 17, 18, and side plates, one of which is shown at 19. The next tray comprises bottom panel 21, front and rear end plates 22, 23, and side plates 24, 25. The upper most tray comprises bottom panel 26, front and rear end plates 27, 28, and longitudinal side plates 29, 30.

One means for removably supporting the various elements comprising the display trays will now be described. The front and rear end frame members 12, 13 of the rectangular base are substantially identical in form, and consequently are interchangeable. The front end member comprises an elongated piece of wood or the like, having a rearwardly extending horizontal panel supporting surface 30 disposed on the rear portion of its upper face. Preferably this surface is somewhat lower than the outer upper surface 31. The panel supporting surface terminates forwardly in a vertically disposed, downwardly cut channel or groove 32. The ends of the groove are enlarged to form end recesses 33 which have their bottoms horizontally aligned with the bottom of the groove.

The rear end member 13 is provided with a panel supporting surface 30a, downwardly cut channel 32a, and end recesses, entirely similar to corresponding parts of the front end member.

The intermediate transverse supporting members or bars 14, 15 are similar to each other and are interchangeable. The bar 14 comprises a lower, horizontally disposed, forwardly projecting panel supporting surface 35 having a vertically disposed downwardly cut channel 36 adjacent thereto. Separated from the channel 36 by an appropriate spacing strip 37 is another channel 38, cut to a different depth from the first-mentioned channel. Adjacent thereto is a rearwardly projecting, horizontally disposed, upper panel supporting surface 39. Each of the channels on the members 14, 15 terminates at each of its ends in a recess 40, having its bottom aligned with the adjacent channel.

The transverse supporting members, or bars, may conveniently be made up of a plurality of strips of wood, as disclosed in Figures 3 and 4, or they may be formed from a single piece of stock, if desired.

The longitudinal side members 10, 11 are provided with inwardly projecting horizontally disposed ribs 41, 42. These ribs may conveniently be formed of strips of wood secured in appropriate grooves in the inner face of the side members. The ribs are spaced vertically a distance equal to the ultimate vertical spacing of each of the trays, determined by the vertical distance between the supporting surfaces 35, 39 on the transverse supports.

Each of the members 14, 15 has an inwardly cut horizontal groove 43 on each of its end faces, adapted to receive the ribs 42, whereby each transverse bar is supported thereon. The end recess 40a adjacent the lower channel on each of the transverse supports merges with the groove 43, so that, when the parts are assembled, the rib 42 constitutes a bottom for the recess.

It will be seen that the rearwardly extending horizontal surface 30 on the front end frame member is horizontally aligned with the forwardly extending surface 35 on the bar 14 therebehind. Similarly, the upper rearwardly extending surface 39 on the transverse support 14 is horizontally aligned with the lower, forwardly extending supporting surface 35a on the member 15. The upper, rearwardly extending surface 39a of the latter, is horizontally aligned with the forwardly extending surface 30a of the rear end frame member 13. Thus the supporting surface on the several transverse members which extend toward each other constitute pairs of panel supporting surfaces lying in horizontally disposed vertically spaced planes.

Obviously, if the display stand were to have five instead of three trays, it would only be necessary to extend the longitudinal side members an appropriate amount, raises the rear end frame member 13 a distance to take care of the increasing height resulting from five steps, and add two more properly spaced transverse supporting members.

Since the front and rear end plate supporting grooves 32, 36, 38 etc., are each cut to the same depth as their adjacent supporting surfaces, front and rear end plates 17, 18, 22, 23, etc., when inserted therein, will be supported in proper relation thereto. These end plates are thus related and supported in proper relation to the adjacent tray bottom panels to form therewith a plurality of terraced trays.

The longitudinal side edge plates are similarly supported in the several end recesses. Since the bottoms of the end recesses are aligned with adjacent channel bottoms, the side plates are supported at the same level as adjacent end plates. As stated above, the ribs 42 constitute bottom surfaces for certain of the end recesses, but since they are aligned with the adjacent channel bottoms, the same result is effected as though the bottoms of those particular recesses were integral with the transverse supports.

A convenient method of securing the side and end frame members together is disclosed in Figure 5. A block 50 is secured to the inner face of each side frame member spaced from each end thereof a distance equal to the thickness of each of the end frame members. An inwardly projecting bolt 51 projects from the inner face of each block. The front and rear end frame members are provided with an angle bracket 52 having an opening to receive the bolt. A nut 53 serves to draw the parts together.

In Figures 7 to 10, inclusive, a second manner of assembling the parts of the display equipment of the present invention is disclosed. This form of the invention differs from the form previously described primarily in the respect that it relates to a non-terraced, or horizontally aligned set of display trays. A second difference resides in the fact that the form now to be described is peculiarly adapted for use with a conventional flanged table top or counter, and does not require the use of special side frame members. Although the transverse supporting frame members, or bars, are of a specifically different construction, the equipment as a whole is assembled on essentially the same principle as in the first form.

In the drawings a conventional counter or table 61 is shown in dotted lines, having a top 62 provided with an upstanding flanged edge 63. Although this flanged top is not a part of the present invention, it cooperates with the new equipment to retain certain parts thereof in predetermined position. The upstanding flange comprises end members 66, 67 and front and rear members 64, 65.

In this form of the invention we provide a plurality of transverse supporting frame members, or bars 68 which are adapted to be supported upon the table top in parallel spaced relation. Each pair is formed with a pair of horizontally disposed tray bottom panel supporting surfaces 69, 70, and a downwardly cut, edge plate receiving groove 71 located between the said surfaces.

The transverse supporting bars are all substantially identical, and are all interchangeable except the end bars 72, 73. Since the latter bars are designed to support only one tray bottom panel each, they are each provided with only a single horizontally disposed supporting surface. Referring to Figure 8, it will be noted that the bar 72 is formed with a horizontal panel supporting surface 74, and with a shoulder 75, which shoulder corresponds to the edge plate receiving grooves of the members 68. The other transverse end supporting bar 73 is substantially identical to the bar 72, and is interchangeable therewith.

In assembling the several elements of the second form of display equipment, the transverse supporting bars 68 are positioned upon the table top, in properly spaced, parallel relation, with their several ends spaced inwardly a short distance from the inner faces of the front and rear flanges 64, 65. The end supporting members 72, 73 are then put in place, as disclosed in Figure 8, and, if desired, secured to the flanges 66, 67 in any appropriate manner. Transverse tray edge plates 76 may then be slipped into the grooves 71 of each of the bars 68, and into the spaces above each of the shoulders 75 of the bars 72, 73. Tray bottom panels 77 may then be supported upon the respective horizontal supporting surfaces 69, 70, 74. Tray front and rear edge plates 78, 79 which may be in the form of continuous strips, or short individual plates, may then be placed in the spaces afforded between the ends of the bars 68, 72, 73 and the inner face of the front and rear flanges 64, 65. When the parts are thus assembled, a plurality of horizontally aligned display trays are provided, in substantially the form disclosed in Figure 7.

An important feature of the present invention relates to means for dividing the several trays into smaller bins or compartments and a preferred form of partitioning means will now be described. Broadly considered, the partitioning means comprises a partition plate and a plurality of positioning clips associated therewith and adapted to secure the plate in any desired adjusted relation upon the trays. In the drawings, such a partition plate is indicated at 80, and it will be noted that the same is supported upon one or another of the tray bottom panels 77, 21, 26, etc. The plate is secured in predetermined position by one or more partition clips 55, of special construction.

Figure 2:
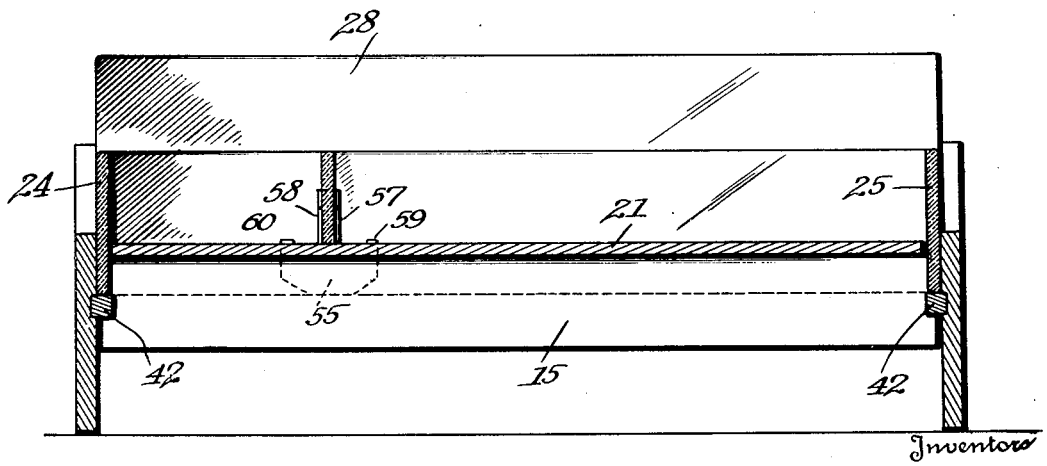
Figure 2 is a transverse vertical sectional view taken on lines 2—2 of Figure 1, but with the removed parts in their proper places.

The edge plate receiving grooves formed in the transverse supporting members used in both forms of the invention are made of such a dimension that there is a slight clearance between the faces of the edge plates secured therein and the opposite walls of the grooves. This clearance is sufficient to receive the body 55 of a partition holding clip in adjustable, frictional engagement. Each clip comprises a body portion 55, an upwardly extending neck 56, and forwardly projecting, partition plate engaging wing members 57, 58. Horizontally projecting flanges 59, 60 serve to limit the extent to which the body of each clip may be forced downwardly into the grooves. As disclosed in Figures 2, 6 and 7 to 10 inclusive, the clips may be inserted adjacent the front, rear, or side edges of each of the trays, and appropriate partition plates secured therein, in any desired relation.

The body 55 of each clip may be formed of spring metal and may be slightly bent upon vertical lines, so as to insure frictional contact with a wall of the grooves. As disclosed in Figure 9, the presence of one of these spring bodies tends to force the adjacent edge plate 76 into firm contact with the opposite wall of the groove 71, whereby wobbling or rattling of the plate is prevented.

In practice the various frame members are preferably made of wood, and the tray bottom panels are either constructed of wood, metal, or fibre board. Although the invention is not limited thereto, it is preferred to use glass for the end and side plates. This combination results in a display stand which is extremely attractive, and which enhances the ornamental appearance of the goods being displayed thereon.

It will be seen that we have described a device which is capable of accomplishing the stated objects of the invention. Many modifications of the specific forms of display equipment disclosed herein will readily occur to one skilled in the art, and all such modifications as fall within the scope of the appended claims, or their equivalents, are to be considered as within the invention.

We claim:—

1. Display equipment comprising a plurality of article receiving trays, adjustable partition means therefor, and supporting means for said trays, said trays each comprising a bottom panel and upstanding edge plates, said supporting means comprising a plurality of elongated supporting bars, each having a horizontally disposed tray bottom panel supporting surface and adjacent thereto a downwardly cut edge plate receiving groove, whereby bottom panels and edge plates may be assembled and supported thereon in predetermined relation to form trays, said partition means comprising an upstanding partition plate and a positioning clip therefor, said clip having means engageable with said partition plate and a depending body adapted to be adjustably secured in one of said edge plate receiving grooves.

2. Display equipment comprising a plurality of article receiving trays, adjustable partition means therefor, and supporting means for said trays, said trays each comprising a bottom panel and upstanding edge plates, said supporting means comprising a plurality of elongated supporting bars having pairs of oppositely extending horizontally disposed tray bottom panel supporting surfaces and between each pair of said surfaces a downwardly cut edge plate receiving groove, whereby bottom panels and edge plates may be assembled and supported thereon in predetermined relation to form trays, said partition means comprising an upstanding partition plate and a positioning clip for each end of said plate, each of said clips having means engageable with said partition plate and a depending body adapted to be adjustably secured in one of said plate receiving grooves.

3. Display equipment comprising a plurality of display trays, adjustable partition means therefor, and supporting means for said trays, each of said trays comprising a bottom panel and upstanding edge plates, said supporting means comprising a plurality of frame members, each having horizontally disposed panel supporting surfaces and a downwardly cut edge plate receiving groove adjacent thereto, said partition means comprising a partition plate and positioning clips adapted to secure adjustably said partition plate in a plurality of different positions on said panel, said clips each comprising partition plate engaging wings and a downwardly extending body adapted to be received and adjustably supported in one of said tray edge plate receiving grooves.

4. In combination, a display tray, a grooved supporting frame member therefor, and partition means for said tray said tray comprising a plurality of upstanding edge plates, at least one of which is supported in the groove in said supporting frame member, and a bottom panel supported on said member adjacent said plate, said partition means comprising an upstanding partition plate and an adjustably mounted positioning clip therefor, said clip comprising partition plate engaging wings and a depending body secured adjustably in said groove in frictional engagement with a wall thereof and with a face of the tray edge plate supported in said groove.

5. In combination, a display tray, a grooved supporting frame member therefor, and partition means for said tray, said tray comprising a plurality of upstanding edge plates, at least one of which is supported in the groove in said supporting frame member, and a bottom panel supported on said member adjacent said plate, said partition means comprising an upstanding partition plate disposed above and supported upon said tray bottom panel and an adjustably mounted positioning clip therefor, said clip comprising partition plate engaging wings and a depending body secured adjustably in said groove in engagement with a wall thereof and with a face of the tray edge plate supported in said groove.

6. A display stand comprising longitudinal side frame members, transverse front and rear end frame members connected together to form a rectangular base, an intermediate transverse supporting member connected to said side frame members, and a plurality of display trays supported thereon in terraced relation to each other, each of said trays comprising a horizontal bottom panel, said transverse front and rear end frame members and said intermediate transverse supporting member each having a horizontal surface extending toward the adjacent transverse member, the surfaces on adjacent members extending toward each other being disposed in the same plane and being adapted to support one of said bottom panels, each pair of surfaces extending toward each other and the tray supported thereby being spaced vertically from the next in terraced relation.

7. A display stand comprising longitudinal side frame members, transverse front and rear end frame members connected together to form a rectangular base, an intermediate transverse supporting member connected to said side frame members, and a plurality of display trays supported thereon in terraced relation to each other, each of said trays comprising a horizontal bottom panel and vertically disposed longitudinal side plates and transverse front and rear end plates, said transverse front and rear end frame members and said intermediate transverse supporting member each having a horizontal surface extending toward the adjacent transverse member, the surfaces on adjacent members extending toward each other being disposed in the same plane and being adapted to support a bottom panel of a tray, each pair of surfaces extending toward each other and the tray supported thereby being spaced vertically from the next, each of said transverse members having a channel adjacent each of its horizontal surfaces, said channel being adapted to support a vertically disposed transverse front or rear end plate of the adjacent tray, said base including means for supporting the vertically disposed side plates at the same level as the adjacent end plates.

8. A display stand comprising longitudinal side frame members and transverse frame members interconnected to form a base, each of said transverse members having a horizontal surface extending toward the adjacent transverse member, the surfaces on adjacent members extending toward each other constituting pairs of panel supporting surfaces lying in spaced horizontal planes, a horizontal tray bottom panel on each of said surfaces, each of said transverse members having a channel adjacent each supporting surface and a vertically disposed transverse tray end plate supported upon the bottom of each channel in predetermined relation to the adjacent horizontal panel, said longitudinal side frame members having supporting means and vertically disposed longitudinal tray side plates supported by said means in horizontally aligned relation to the adjacent transverse end plates, whereby said horizontal panels and said vertical plates are related and supported to form terraced display trays.

9. A display stand comprising longitudinal side frame members and transverse frame members interconnected to form a base, each of said transverse members having a horizontal surface extending toward the adjacent transverse member, the surfaces on adjacent members extending toward each other constituting pairs of panel supporting surfaces lying in spaced horizontal planes, a horizontal tray bottom panel on each pair of surfaces, each of said transverse members having a channel adjacent each supporting surface, and a vertically disposed transverse tray end plate supported upon the bottom of each channel in predetermined relation to the adjacent horizontal panel, said longitudinal side frame members and said transverse members having cooperating supporting surfaces, and vertically and longitudinally disposed tray side plates supported on said cooperating surfaces in horizontally aligned relation to the adjacent transverse end plates, whereby said horizontal panels and said vertical plates are related and supported to form terraced display trays.

10. A display stand comprising longitudinal side frame members and transverse frame members interconnected to form a base, each of said transverse members having a horizontal surface extending toward the adjacent transverse member, the surfaces on adjacent members extending toward each other constituting pairs of panel supporting surfaces lying in spaced horizontal planes, a horizontal tray bottom panel on each pair of surfaces, each of said transverse members having a channel adjacent each supporting surface, and a vertically disposed transverse tray end plate supported upon the bottom of each channel in predetermined relation to the adjacent horizontal panel, said longitudinal side frame members and said transverse members having horizontally disposed supporting surfaces horizontally aligned with the bottoms of adjacent panels, and vertically and longitudinally disposed tray side plates supported upon said surfaces in horizontal alignment with said end plates in adjacent channels, whereby said horizontal bers, transverse front and rear end frame members, intermediate transverse supports, and a plurality of separable tray bottom panels and upstanding tray edge plates, said front end frame member comprising a vertically disposed channel terminating in end recesses, and a horizontal supporting surface, said intermediate transverse support comprising two vertically disposed channels cut to different bottom levels and terminating in end recesses, and a horizontal supporting surface adjacent each channel, said transverse rear end frame member comprising a vertically disposed channel terminating in end recesses, and a horizontal supporting surface, the horizontal supporting surfaces on each transverse member which extend toward each other and the channels and recesses adjacent thereto being in common planes respectively, one of said tray bottom panels being horizontally supported on the surfaces lying in each said horizontal plane, adjacent tray edge plates being supported in said channels and said end recesses to form a plurality of terraced trays.

18. A knock-down terraced display stand comprising longitudinal side frame members, front and rear transverse frame members removably secured thereto, and intermediate transverse supports, each of said longitudinal side members having a horizontally projecting rib on its inner face and each of said transverse supports having a complemental groove on each of its outer end faces to receive said rib, whereby said support is adjustably mounted thereon, said support and adjacent end members having cooperating horizontal supporting surfaces upon which tray bottom panels are removably supported in terraced relation, said members also having adjacent each of said surfaces a downwardly cut channel in which tray end plates are removably supported in predetermined relation to adjacent tray bottom panels, said transverse members each having an end recess adjacent the ends of said channels, and a plurality of tray side plates removably supported at their opposite ends in said recesses in predetermined relation to said bottom panels and said end plates to form terraced trays.

19. A knock-down terraced display stand comprising longitudinal side frame members, front and rear transverse frame members removably secured thereto, and intermediate transverse supports, each of said longitudinal side members having a horizontally projecting rib on its inner face and each of said transverse supports having a complemental groove on each of its outer end faces to receive said rib, whereby said support is adjustably mounted thereon, said support and adajcent end members having cooperating horizontal supporting surfaces upon which tray bottom panels are removably supported in terraced relation, said members also having adjacent each of said surfaces a downwardly cut channel in which tray end plates are removably supported in predetermined relation to adjacent tray bottom panels, said transverse members each having an end recess adjacent the ends of said channels, certain of said recesses merging with said end grooves, whereby said ribs form bottom supporting surfaces for said certain recesses, and a plurality of tray side plates removably supported at their opposite ends in said recesses in predetermined relation to said bottom panels and said end plates to form terraced trays, one end of certain of said side plates being supported in said recesses by said ribs.

20. A knock-down display stand comprising separable side and end frame members interconnected at their ends to form a rectangular base, a plurality of removable, interchangeable, transverse supporting bars, and a plurality of removable trays supported thereon, said side frame members having means for removably supporting said bars in horizontally spaced and vertically stepped relation, each of said bars having a forwardly projecting lower horizontal panel supporting surface and a higher rearwardly projecting panel supporting surface, said surfaces on each bar being separated by a vertically disposed spacing strip, the upper rearwardly extending surface of each bar being horizontally aligned with the lower forwardly extending surface of the next bar therebehind, whereby trays may be horizontally supported thereon in stepped relation.

21. A knock-down display stand comprising a separable side and end frame members interconnected at their ends to form a rectangular base, a plurality of removable, interchangeable transverse supporting bars, and a plurality of removable and individually separable trays supported thereon, said trays comprising bottom panels and upstanding end plates, said side frame members having means for removably supporting said bars in horizontally spaced and vertically stepped relation, each of said bars having a forwardly projecting lower horizontal panel supporting surface and a higher rearwardly projecting panel supporting surface, each of said bars having a vertically disposed channel adjacent the inner edge of each of said surfaces, the upper rearwardly extending surface of each bar and its adjacent channel being horizontally aligned with the lower forwardly extending surface of the next bar therebehind, whereby tray panels may be horizontally supported in stepped relation thereon, and front and rear end plates supported in said channels in corresponding stepped relation.

22. A knock-down display stand comprising separable side and end frame members interconnected at their ends to form a rectangular base, a plurality of removable, interchangeable transverse supporting bars, and a plurality of removable and individually separable trays supported thereon, said trays comprising bottom panels and end plates, said side frame members having means removably supporting said bars in horizontally and vertically spaced relation, each of said bars having a forwardly projecting lower horizontal panel supporting surface and a higher rearwardly projecting panel supporting surface, said surfaces on each bar being vertically spaced a distance equal to the vertical spacing of said bars, one from the other, each of said bars having a vertically disposed channel adjacent the inner edge of each of said surfaces, the upper rearwardly extending surface of each bar and its adjacent channel being horizontally aligned with the lower forwardly extending surface of the next bar therebehind, whereby tray panels may be horizontally supported in stepped relation thereon, and front and rear end plates supported in adjacent channels in correspondingly stepped relation.

23. A knock-down display stand comprising side frame members, front and rear frame members, a plurality of removable, interchangeable transverse supporting bars, and a plurality of panels and said vertical plates are related and supported to form terraced trays.

11. A display stand comprising longitudinal side frame members and transverse frame members interconnected to form a base, each of said transverse members having a horizontal surface extending toward the adjacent transverse member, the surfaces on adjacent members extending toward each other constituting pairs of panel supporting surfaces lying in spaced horizontal planes, a horizontal tray bottom panel on each pair of surfaces, each of said transverse members having a channel adjacent each supporting surface, and a vertically disposed transverse tray end plate supported upon the bottom of each channel in predetermined relation to the adjacent horizontal panel, said longitudinal side frame members and said transverse members having horizontally disposed supporting surfaces horizontally aligned with the bottoms of adjacent channels, and vertically and longitudinally disposed tray side plates supported at opposite ends only upon said surfaces in horizontal alignment with said end plates in adjacent channels, whereby said horizontal panels and said vertical plates are related and supported to form terraced trays.

12. A display stand comprising longitudinal side frame members and transverse frame members interconnected to form a base, each of said transverse members having a horizontal surface extending toward the adjacent transverse member, the surfaces on adjacent members extending toward each other constituting pairs of panel supporting surfaces lying in spaced horizontal planes, a horizontal panel on each of said surfaces, each of said transverse members having a channel adjacent each supporting surface, and a vertically disposed transverse end plate supported upon the bottom of each channel in predetermined relation to the adjacent horizontal panel, said longitudinal side frame members having horizontally projecting supporting surfaces disposed in the same plane as adjacent channel bottoms, and vertically disposed longitudinal side plates supported thereon in horizontally aligned relation to the adjacent transverse end plates, whereby said horizontal panels and vertical plates are related and supported to form terraced display trays.

13. A display stand comprising transverse front and rear end frame members, longitudinal side frame members, and an intermediate transverse frame member, and a plurality of display trays supported thereon in terraced relation, each tray comprising a horizontal bottom panel, and upstanding side and end plates, said longitudinal side frame members each having a horizontal rib projecting into a groove in the end face of said intermediate frame member to secure the same thereto, said last mentioned member having a pair of vertically spaced horizontal panel supporting surfaces on opposite sides thereof, and adjacent each of said surfaces a vertical channel, the bottom of one of said channels being aligned with the top of said rib, the bottom of the other of said channels being aligned with the bottom of an end recess in said member adjacent thereto, said channel bottoms being adapted to support the upstanding end plates of adjacent display trays, said trays including bottom panels supported by the adjacent horizontal supporting surfaces, the upstanding side plates of said trays being supported at their opposite ends, respectively, by the top of said rib and the bottom of said end recesses.

14. A display stand comprising transverse front and rear end frame members, longitudinal side frame members, and an intermediate transverse frame member, and a plurality of display trays supported thereon in terraced relation, each tray comprising a horizontal bottom panel, and upstanding side and end plates, said longitudinal side frame members each having a horizontal rib projecting into a groove in the end face of said intermediate frame member to secure the same thereto, said last mentioned member having a pair of vertically spaced horizontal panel supporting surfaces on opposite sides thereof, and adjacent each of said surfaces a vertical channel, the bottom of the lower of said channels being aligned with the top of said rib, the bottom of the upper of said channels being aligned with the bottom of an end recess in said member adjacent thereto, said channel bottoms being adapted to support the upstanding end plates of adjacent display trays, said trays including bottom panels supported by the adjacent horizontal supporting surfaces, the upstanding side plates of said trays being supported at their adjacent ends, respectively, by the top of said rib and the bottom of said end recess.

15. A display stand comprising transverse front and rear end frame members, longitudinal side frame members, and an intermediate transverse frame member, and a plurality of display trays supported thereon in terraced relation, each tray comprising a horizontal bottom panel, and upstanding side and end plates, said longitudinal side frame members each having a horizontal rib projecting into a groove in the end face of said intermediate frame member to secure the same thereto, said last mentioned member having a pair of vertically spaced horizontal panel supporting surfaces on opposite sides thereof, and adjacent the inner edge of each of said surfaces a vertical channel, said channels being separated by a vertically disposed spacing strip, the bottom of one of said channels being aligned with the top of said rib, the bottom of the other of said channels being aligned with the bottom of an end recess in said member adjacent thereto, said channel bottoms being adapted to support the upstanding end plates of adjacent display trays, said trays including bottom panels supported by the adjacent horizontal supporting surfaces and upstanding side plates supported at their adjacent ends, respectively, by the top of said rib and the bottom of said end recess.

16. A terraced display stand comprising a plurality of trays and means for supporting the same in vertically stepped relation, each tray comprising a horizontal bottom panel and upstanding side and end plates, said supporting means comprising a transverse bar having oppositely extending and vertically spaced-apart horizontal surfaces adapted to support adjacent front and rear edges of adjacent tray bottom panels at different levels, said bar also having a vertically disposed channel adjacent each of said horizontal surfaces adapted to support adjacent front and rear tray end plates at levels corresponding to the levels of said bottom panels, and means for supporting other edges of said bottom panels, and means for supporting the other end and side plates of said trays in corresponding relation to said bottom panels.

17. A knock-down terraced display stand comprising separable longitudinal side frame memremovable trays supported thereon, said front and rear frame members each having an inwardly projecting horizontal tray supporting surface vertically spaced apart one from the other, said side frame members having means for removably supporting said bars in horizontally spaced and vertically stepped relation, each of said bars having a forwardly projecting lower horizontal tray supporting surface and a higher rearwardly projecting tray supporting surface, the lower forwardly projecting surface of the first transverse bar being horizontally aligned with said surface on said front end frame member, the upper rearwardly projecting surface on said first bar being horizontally aligned with the lower forwardly projecting surface on the next bar therebehind, the upper surface of the last bar being horizontally aligned with said surface on said rear end frame member whereby said trays may be assembled and supported on said surfaces in terraced relation.

24. A knock-down display stand comprising side frame members, front and rear frame members, a plurality of removable, interchangeable transverse supporting bars, and a plurality of removable trays comprising bottom panels and edge plates supported thereon, said front and rear frame members each having an inwardly projecting horizontal panel supporting surface vertically spaced apart one from the other, said side frame members having means for removably supporting said bars in horizontally spaced and vertically stepped relation, each of said bars having a forwardly projecting lower horizontal panel supporting surface and a higher rearwardly projecting panel supporting surface, the lower forwardly projecting surface of the first transverse bar being horizontally aligned with said surface on said front end frame member, the upper rearwardly projecting surface on said first bar being horizontally aligned with the lower forwardly projecting surface on the next bar, the upper surface of the last bar being horizontally aligned with said surface on said rear end frame member, said bars and end frame members having vertically disposed edge plate receiving channels adjacent each of said supporting surfaces, whereby said panels and edge plates may be assembled and supported on said surfaces and in said channels to form terraced trays.

25. Means for supporting a plurality of panels and plates in assembled relation to form display trays upon a flange store counter comprising a plurality of elongated bars supported on said counter in horizontally aligned parallel relation, each of said bars having a horizontal panel supporting surface formed thereon and extending toward each adjacent bar, and each of said bars having a downwardly extending plate receiving groove, whereby panels are supported upon horizontal surfaces of adjacent bars, and plates are supported in said grooves to form a plurality of tray bottoms and tray edge flanges, the end faces of said bars comprising means to maintain other plates in position to form other tray edge flanges.

26. Means for supporting a plurality of panels and plates in assembled relation to form display trays upon a flanged store counter, comprising a plurality of elongated bars adapted to be supported on the top of said counter, and extending substantially thereacross and having their opposite ends spaced from the front and rear flanges of said counter, each of said bars having a horizontally disposed panel supporting surface extending toward each adjacent bar and also having adjacent each of said surfaces a downwardly cut plate receiving groove, whereby panels and plates may be supported upon adjacent bars to form a plurality of tray bottoms and tray edge flanges, the spaces between the ends of said bars and the front and rear flanges on said counter serving to receive and support other edge plates adapted to form tray front and rear flanges.

27. A display stand comprising a display tray, partition means therefor, and supporting means for said tray, said tray comprising a bottom panel and upstanding edge plates, said supporting means comprising frame members having horizontally disposed panel supporting surfaces and adjacent each of said surfaces a downwardly cut edge plate receiving groove, said partition means comprising a partition plate and positioning clips adapted to secure adjustably said partition plate in one of a plurality of different positions on said panel, said clips each comprising partition plate engaging wings, and a downwardly extending body adapted to be received and adjustably supported in one of said tray edge plate receiving grooves.

WILLIAM B. MORTON.
LAWRENCE F. BEISNER.